United States Patent
Joung et al.

(10) Patent No.: US 8,374,656 B2
(45) Date of Patent: Feb. 12, 2013

(54) MOBILE COMMUNICATION DEVICE AND METHOD FOR CONTROLLING THE SAME

(75) Inventors: Joung Young Joung, Namyangju-si (KR); Yoo Seok Cho, Yongin-si (KR); Jae Boem Im, Seoul (KR)

(73) Assignee: LG Electronics Inc., Seoul (KR)

( * ) Notice: Subject to any disclaimer, the term of this patent is extended or adjusted under 35 U.S.C. 154(b) by 810 days.

(21) Appl. No.: 11/802,508

(22) Filed: May 23, 2007

(65) Prior Publication Data

US 2007/0275773 A1 Nov. 29, 2007

(30) Foreign Application Priority Data

May 24, 2006 (KR) .................. 10-2006-0046718
May 25, 2006 (KR) .................. 10-2006-0047177

(51) Int. Cl.
*H04M 1/00* (2006.01)

(52) U.S. Cl. ............... 455/575.3; 455/575.4; 455/575.1

(58) Field of Classification Search .... 455/575.1–575.9, 455/344–350, 90.3, 550.1, 556.1, 556.2, 455/557; 345/158, 169; 361/600, 625, 679.01–679.09, 679.1, 679.11–679.19, 361/679.2, 679.21–679.29, 679.3, 679.31–679.69, 361/679.4; 370/310.2, 328, 338, 351–356
See application file for complete search history.

(56) References Cited

U.S. PATENT DOCUMENTS 7,672,691 B2 * 3/2010 Kim et al. ............... 455/558
2004/0116167 A1 * 6/2004 Okuzako et al. ........... 455/575.3
2005/0009581 A1 * 1/2005 Im et al. ..................... 455/575.4
2005/0014538 A1 * 1/2005 Hyun et al. ................. 455/575.4
2005/0164745 A1 * 7/2005 Oe et al. ...................... 455/566
2006/0121959 A1 * 6/2006 Cha et al. .................... 455/575.1

FOREIGN PATENT DOCUMENTS

| KR | 10-2003-0000889 A | 1/2003 |
| KR | 10-2005-0015787 A | 2/2005 |
| KR | 10-2005-0026660 A | 3/2005 |

OTHER PUBLICATIONS

Sony DSC-T1 Digital Still Camera Manual, 2003.*

* cited by examiner

*Primary Examiner* — Jinsong Hu
*Assistant Examiner* — San Htun
(74) *Attorney, Agent, or Firm* — Birch, Stewart, Kolasch & Birch, LLP

(57) ABSTRACT

A mobile communication device is provided. The mobile communication device includes a first body including a display, a second body foldably connected to the first body, a slider body slidably connected to the second body, the slider body having at least one key that is exposed when the slider body is moved into an open position, and a camera arranged at the second body, the camera being exposed when the slider body is moved into the open position. A method for controlling the same is also provided. The method includes executing a first mode when the first body and second body foldably connected to each other are unfolded, and executing a second mode other than the first mode when a slider body slidably coupled to the second body is moved.

5 Claims, 12 Drawing Sheets

MOBILE COMMUNICATION DEVICE AND METHOD FOR CONTROLLING THE SAME

CROSS REFERENCE TO RELATED APPLICATIONS

This application claims the benefit of Korean Patent Application Nos. 10-2006-0046718, filed May 24, 2006, and 10-2006-0047177 filed May 25, 2006, which are hereby incorporated by reference in their entireties.

BACKGROUND OF THE INVENTION

1. Field of the Invention

The present invention relates to a mobile communication device and a method for controlling the same, and more particularly, to a mobile communication device having a combination of a folder type structure and a slide type structure, and a method for controlling the mobile communication device.

2. Description of Related Art

Generally, mobile communication devices such as mobile phones and PDAs have been developed to a level capable of providing services associated with text information, image information, and games, in addition to delivery of simple voice information. Recently, multi-function mobile communication devices have also been developed which have an audio player function for playing back audio files, such as MP3 files, a digital camera function for capturing digital photographic images and video images, and a radio and video broadcast receiver function. Thus, mobile communication devices, the applications of which are gradually expanding, have become a necessity of life.

In addition to the myriad functions, the design of a mobile communication device has also been taken into consideration. That is, mobile communication devices having various designs have been developed. For example, there are simple bar type devices, folder type devices, in which two bodies are rotatable about a hinge with respect to each other to open or close the device, and slide type devices, in which two bodies are slidable with respect to each other to open or close the device.

However, these devices are insufficient to satisfy the demand of consumers desiring a new and unique design because consumers have already become familiar with these devices. For this reason, it is necessary to continually develop mobile communication devices having new and creative designs.

BRIEF SUMMARY OF THE INVENTION

Accordingly, the present invention is directed to a mobile communication device and a method for controlling the same that substantially obviate one or more problems due to limitations and disadvantages of the related art.

An object of the present invention is to provide a mobile communication device having a new design capable of satisfying the demand of consumers, and a method for controlling the mobile communication device.

Another object of the present invention is to provide a mobile communication device having a structure capable of enabling the user to conveniently perform a photographing operation and a method for controlling the mobile communication device.

Another object of the present invention is to provide a mobile communication device having a structure capable of enabling the user to conveniently use functions associated with multimedia, and a method for controlling the mobile communication device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile communication device is provided. The mobile communication device includes a first body including a display, a second body foldably connected to the first body, a slider body slidably connected to the second body, the slider body having at least one key that is exposed when the slider body is moved into an open position, and a camera arranged at the second body, the camera being exposed when the slider body is moved into the open position.

In a further aspect, the device may further include a controller located in device and the controller is configured to execute a photographing mode when the slider body is moved into the open position.

In another aspect, the device may further include a controller located in the device and the controller is configured to execute a menu selection mode for selection of additional functions when the slider body is moved into the open position.

In yet another aspect, the device may further include a photographing shutter button located on a side surface of the mobile communication device at one of the corners of the device. Thee photographing shutter button may be configured to enable a user to perform a photographing operation while grasping the corners of the device.

In another aspect, the display may be located on the first body such that the display is exposed in a closed position of the first and second bodies.

In yet another aspect, the display may be directed opposite to the camera. In addition, the at least one key may be exposed in the same direction as the display, and the at least one key may be configured to control additional functions of the device.

In still another aspect, the device may include a card-mounting slot provided at the second body. The card-mounting slot may be exposed when the slider body is moved into the open position. For example, the second body may include a side surface and the card-mounting slot may be formed through the side surface of the second body. And the slider body may have a side surface that partially covers the side surface of the second body.

According to principles of the present invention, the mobile device may include a first body including a display, a second body foldably connected to the first body, a slider body slidably connected to the second body, a camera arranged at the second body, the camera being exposed when the slider body is moved into an open position, and a photographing shutter button located on a side surface of the mobile communication device at one of the corners of the device, the photographing shutter button being configured to enable a user to perform a photographing operation while grasping the corners of the device.

In another aspect of the present invention, a method for controlling a mobile communication device having a first body including a display, a second body foldably connected to the first body, and a slider body slidably connected to the second body is provided. The method includes executing a first mode when the first body and second body foldably connected to each other are unfolded, and executing a second mode other than the first mode when a slider body slidably coupled to the second body is moved.

In a further aspect, the second mode may include outputting a screen associated with the second mode on the display when the first body and second body are in a folded state.

In a different aspect, the second mode may include outputting a screen for selection of additional functions provided by the device on the display.

In yet another aspect, the second mode may include directly executing a selected one of additional functions provided by the device.

In another aspect, when the device includes a camera, and the second mode may include activating the camera to enable a photographing operation.

In a different aspect, when the device includes a camera and at least one key, the method may further include exposing the at least one key for controlling functions associated with the camera when the slider body is moved to an open position.

In still another aspect, when the device includes at least one key, the method may further include exposing the at least one key for performing one of selecting, executing, and controlling additional functions of the device when the slider body is moved to an open position. If the device also includes a media file player, the method may further include activating the at least one key to control the media file player of the device when the slider is moved during playback of a media file by the media file player.

In another aspect, the method may further include outputting a data signal to the display of the device if the slider is moved during reception of the data signal by the device.

In a different aspect, the method may further include executing a call connection operation if the slider is moved during reception of a call.

In another aspect, the second mode may include enabling selection of one of a mode for playing back a multimedia file and performing a photographing operation. Alternatively, the second mode may include executing one of a mode for playing back a multimedia file and performing a photographing operation.

In yet another aspect, when the device includes a camera having a lens and at least one key, the method may further include exposing the lens of the camera when the slider body is moved, automatically executing a mode for controlling functions associated with the camera when the slider is moved, outputting a screen through the display of the device when the slider body is moved, and exposing the at least one key for controlling the functions associated with the camera such that the keys are directed in the same direction as the display when the slider body is moved.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
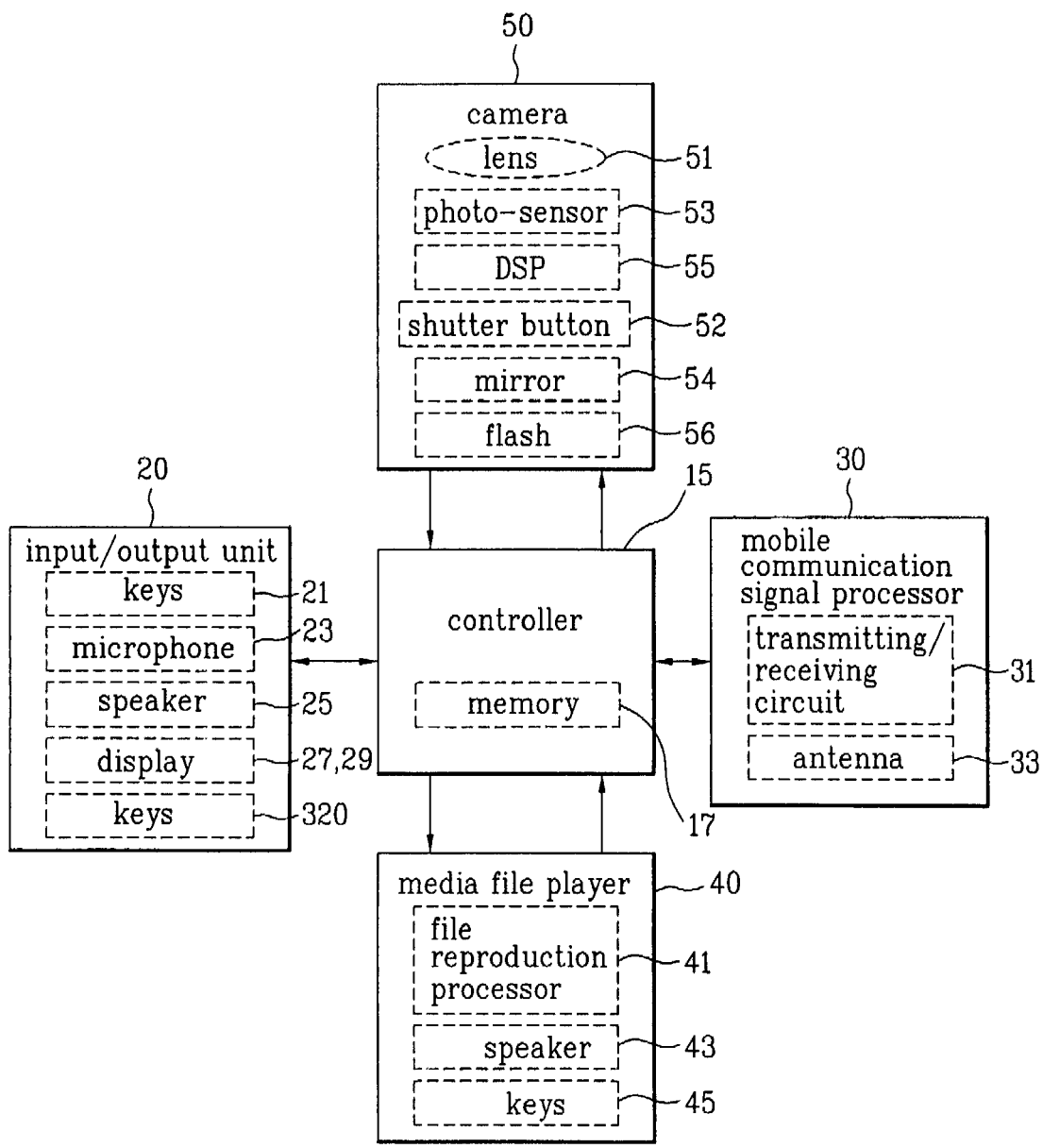
FIG. 1 is a block diagram schematically illustrating a configuration of a mobile communication device according to the present invention.

Reference will now be made in detail to the preferred embodiments of the present invention, examples of which are illustrated in the accompanying drawings. In the following description, the same terms and reference numerals will be used for the same parts, and no repeated description thereof will be given.

FIG. 1 is a block diagram schematically illustrating a configuration of a mobile communication device according to the present invention. As shown in FIG. 1, the mobile communication device includes a controller 15, an input/output unit 20, a mobile communication signal processor 30, and a media file player 40. These elements are mounted in a housing, which includes a first body 100, a second body 200, and a slider body 300, as shown in detail in FIGS. 2 to 10.

The input/output unit 20 includes keys 21 for enabling the user to input a desired signal by pressing a desired one of the keys 21, a microphone 23 for inputting an external sound, a speaker 25 for converting a signal into a sound wave, and displays 27 and 29. Each of the displays may be an LCD. In addition to the keys 21, the input/output unit 20 may further include additional keys 320. The keys 320 may be configured to select additional functions of the mobile communication device and will be described later in detail.

The mobile communication signal processor 30 includes a transmitting/receiving circuit 31. The transmitting/receiving circuit 31 includes a transmission signal processor (not shown) and a reception signal processor (not shown). The transmission signal processor is configured to process a signal or information input through the input/output unit 20, or process information stored in a memory 17 of the controller 15, and to transmit the processed signal or information. The reception signal processor is configured to receive an external electric wave, and processing the received electric wave. The mobile communication signal processor 30 also includes an antenna 33 for externally outputting the electric wave signal processed by the transmitting/receiving circuit 31, or receiving an external electric wave signal. The mobile communication device can wirelessly communicate with an external device, such as, for example, a base station, via the mobile communication signal processor 30.

The media file player 40 reproduces an audio file such as an MP3 file or a media file, such as, for example, a video file stored in the memory 17 of the controller 15, and externally outputs the reproduced signal. To this end, the media file player 40 includes a media file reproduction processor 41 for processing a media file, such as an MP3 file or a video file, a speaker 43 for outputting the signal processed by the file reproduction processor 41 in the form of a sound, and keys 45 for enabling the user to easily operate the media player 40. When the media file player 40 plays back an image, the played-back image may be outputted through one of the displays 27 and 29, or both.

While a separate speaker 43 has been identified for the media file player, it is understood that the speaker 25 of the input/output unit 20 may be used. However, the speaker 43 may be provided separately from the speaker 25, in order to provide a sound with better audio qualities than that provided by speaker 35.

Similarly, the keys 21 of the input/output unit 20 may be used in place of keys 45. However, the keys 45 may be provided on the outer surface of the housing, separately from the keys 21, in order to enable the user to conveniently operate the media file player 40 without opening the mobile communication device.

As shown in FIG. 1, the mobile communication device according to the present invention may further include a camera 50. The camera 50 includes a lens 51, a photo-sensor 53 for converting light emerging from the lens 51 into an analog signal, and a digital signal processor (DSP) 55 for converting the analog signal output from the photo-sensor 53 into a digital signal.

The user can photograph an image using the camera 50 by operating one of the keys 21. For the convenience of the user, however, a photographing shutter button 52, which is separate from the keys 21, may be provided on the mobile communication. It is understood that the photographing shutter button 52 may be provided in place of one or more of keys 21, if desired. The camera 50 may also include a mirror 54 for assisting the user in photographing his figure. The camera may further include a flash 56 for assisting in performing an image capture in a dark area.

Since the structures of the above-described controller 15, input/output unit 20, mobile communication signal processor 30, media file player 40, and camera 50 are similar to those of conventional mobile communication devices, no further detailed description thereof will be given. Hereinafter, the structure of the housing, in which the above-described elements are mounted, and unique arrangements of the elements will be described in detail with reference to FIGS. 2 to 10.

As described in brief, the housing of the mobile communication device according to the present invention includes the first body 100, second body 200, and slider body 300. As a result, the housing includes a combination of a folder type structure and a slide type structure.

Figure 2:
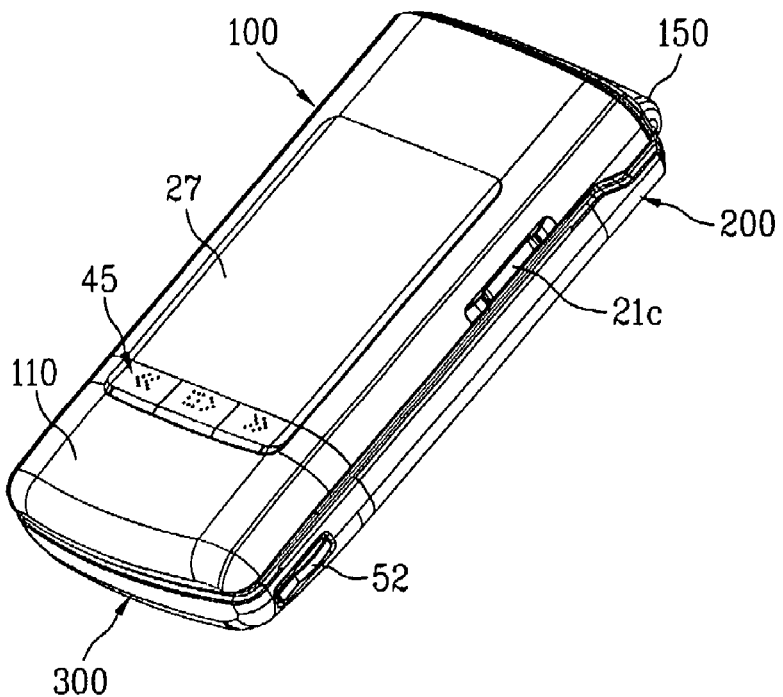
FIG. 2 is a perspective view of the mobile communication device according to the present invention.
Figure 5:
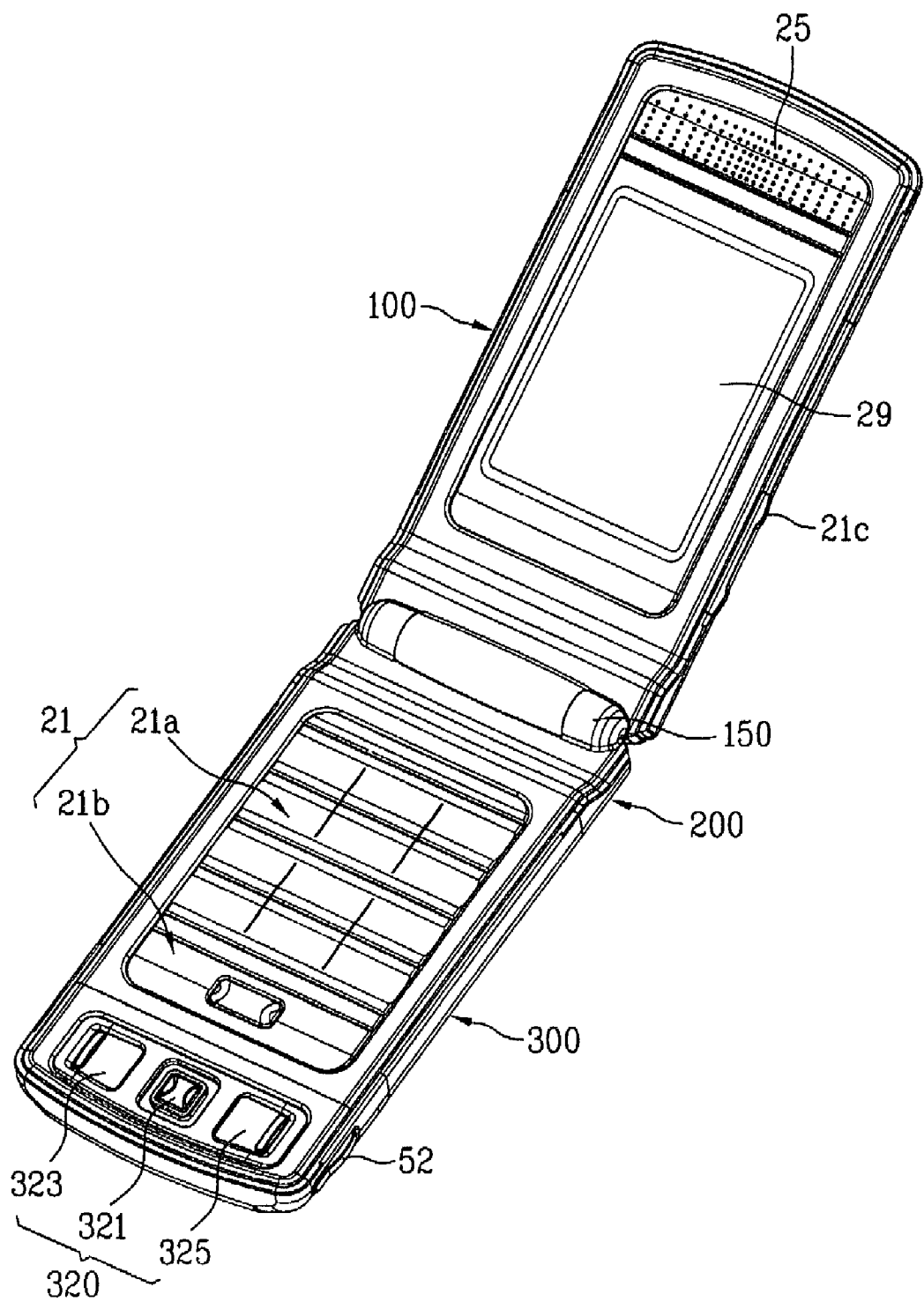
FIG. 5 is a perspective view of the mobile communication device shown in FIG. 2 in a pivotally opened position.

The first body 100 and second body 200 can be folded with respect to each other, as shown in FIG. 2, and can be unfolded with respect to each other, as shown in FIG. 5. The first and second bodies 100 and 200 are foldably connected together by, for example, a hinge 150. As the first body 100 rotates about the hinge 150, the housing is opened or closed with respect to the first body 100 and second body 200.

As shown in FIG. 5, the display 29 which may be referred to as an inner display, and speaker 25 are arranged at an inner surface of the first body 100. In particular, the inner surface of the first body 100 is the surface that faces the second body 200 in a closed state of the housing. The inner display 29 may be activated when the first body 100 rotates to open the housing. When the first body 100 is maintained at an initial position or closed position, the inner display 29 may be inactive. The speaker 25 is configured to output various sounds, such as, for example, output voice during a telephone conversation through the device, output a sound when an incoming call or a message is received, to inform the reception thereof, or output an alarm sound. In addition, the speaker 25 may be configured to output music played back by the media file player 40, without being limited to the above-described functions. A key 21c for adjusting the level of an output sound may be arranged at a side surface of the first body 100.

As shown in FIG. 2, the display 27, which may be referred to as an outer display, is arranged at an outer surface of the first body 100 opposite to the inner surface of the first body 100. The outer display 27 extends lengthwise in a longitudinal direction of the first body 100. The outer display 27 may be activated when the housing is in a closed position. In addition, if desirable, the outer display 27 may be configured to be activated even when the housing is in an open position.

As shown in FIG. 2, the keys 45 for controlling the media file player 40 may be arranged at the outer surface of the first body 100 and adjacent to the outer display 27. The keys 45 may include keys capable of performing general playback functions, such as, for example, play, pause, fast-forward, and reverse/rewind functions. Accordingly, the user can enjoy music, photographs, and images, without opening the housing by controlling the media file player 40 using the keys 45. Each key 45 may be a touch key that is operated when touched by the body of the user or a push key that is operated when pressed.

As seen in FIG. 5, the keys 21 are arranged at an inner surface of the second body 200 facing the first body 100 when the housing is closed. The keys 21 may include, for example, first keys 21a configured to input numerals and characters, and second keys 21b configured to start or end a call service, and to cancel a key input. Although the first and second keys 21a and 21b are shown such that the first keys 21a are positioned above the second keys 21b, their positions may be reversed or may be changed to other positions.

Figure 6:
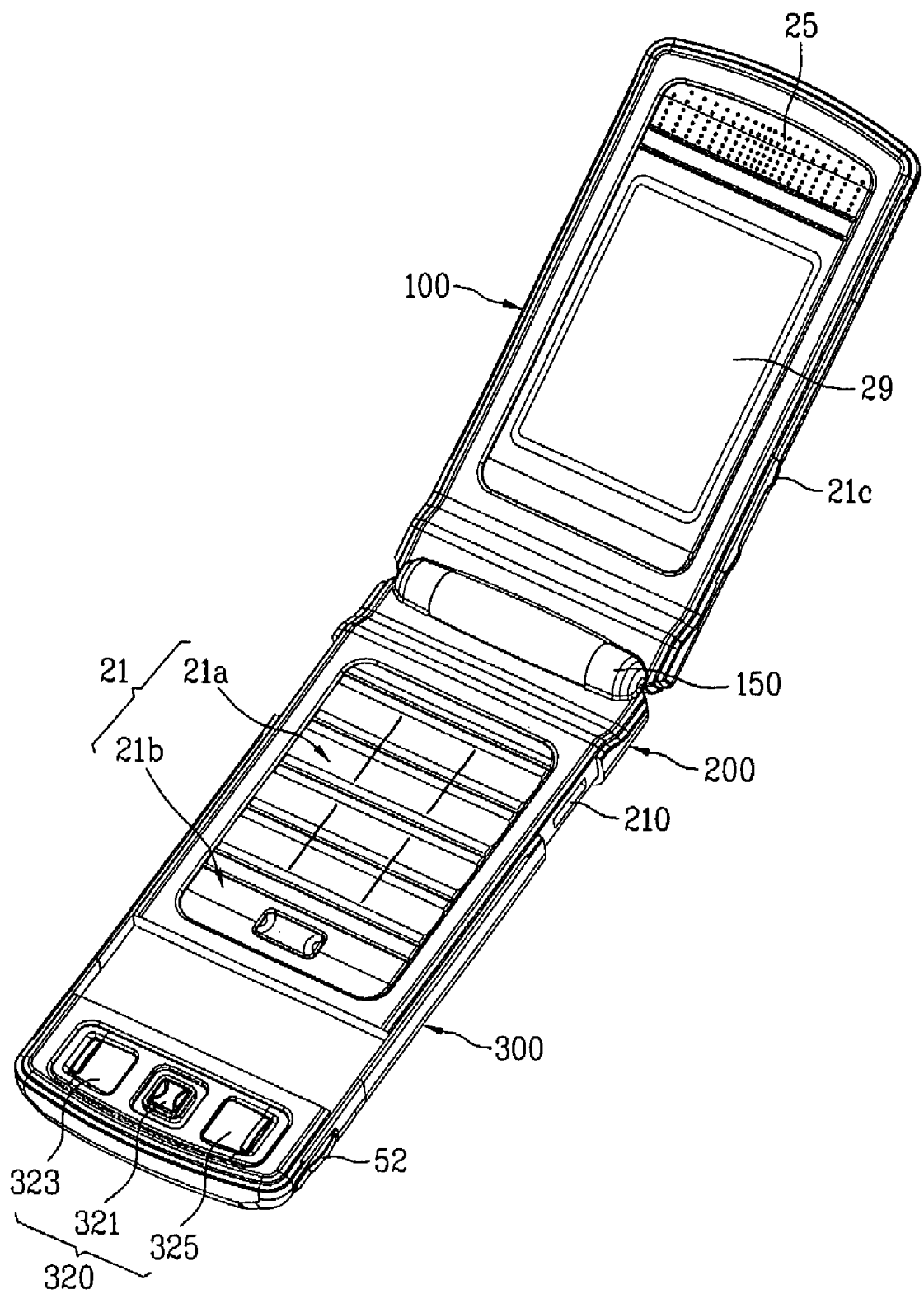
FIG. 6 is a perspective view of the slider body of the mobile communication device shown in FIG. 5 moved into an open position.

As seen in FIG. 6, a card-mounting slot 210 may be formed in the second body 200 and is configured to receive a card therein. In addition, the speaker 43 (FIG. 8) may be arranged at the second body 200. The speaker 43 may be configured to output a sound reproduced by the media file player 40.

Figure 8:
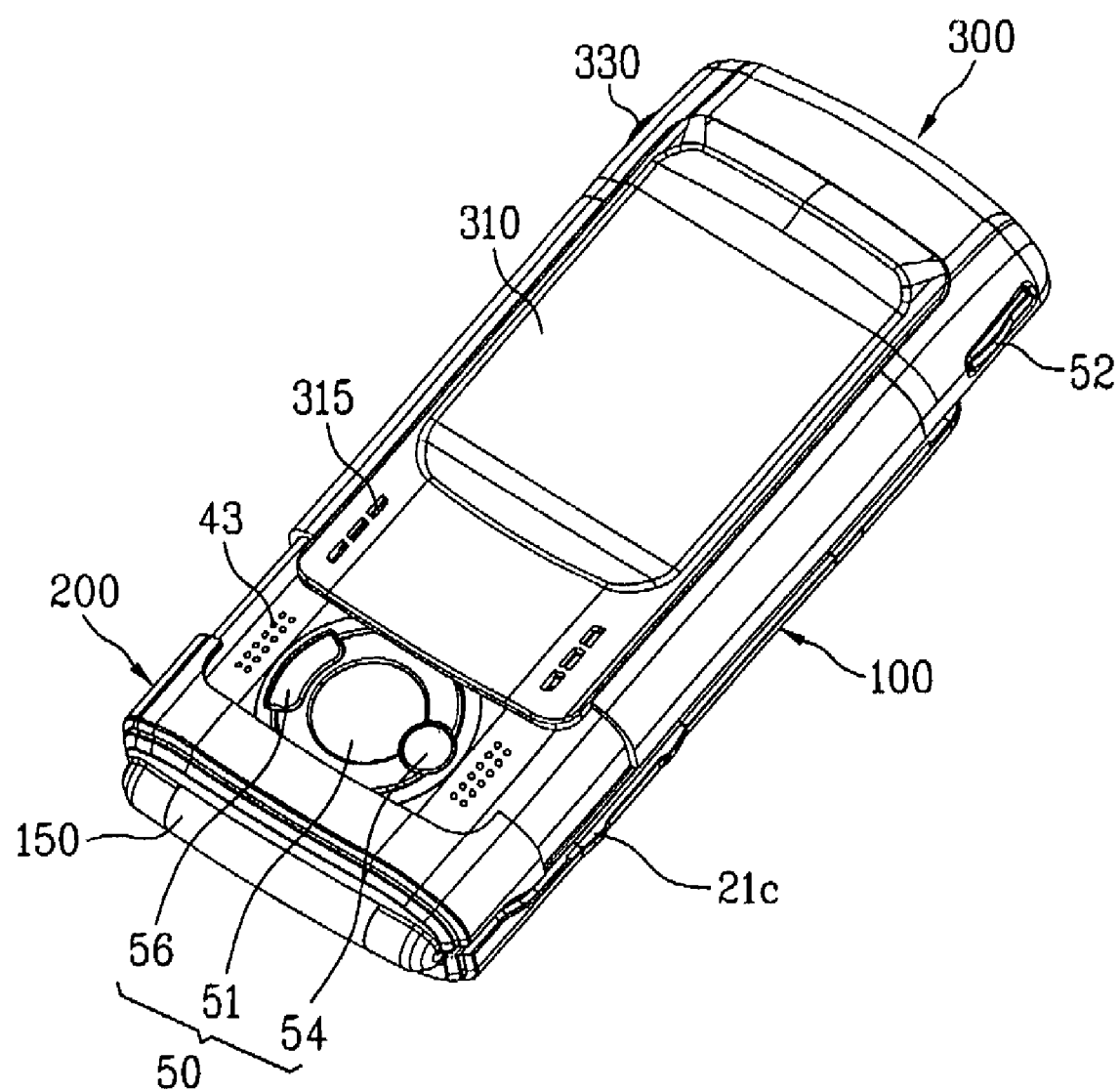
FIG. 8 is a perspective view of the slider of the mobile communication device shown in FIG. 3 moved into the open position.

As seen in FIG. 8, the camera 50 is located in the second body 200. The lens 51 of the camera 50 may be located at an outer surface of the second body 200 opposite to the inner surface of the second body 200. Accordingly, the lens 51 of the camera 50 is arranged to face an inner surface of slider body 310. The mirror 54 and flash 56 may be arranged at the outer surface of the second body 200 adjacent to the lens 51.

The slider body 300 is coupled to the second body 200 such that it is slidable, for example, in a longitudinal direction of the second body 200. Although not shown, the slidable coupling of the slider body 300 to the second body 200 is achieved by sliding modules (not shown) respectively fixed to the slider body 300 and second body 200. The slider modules are adapted to guide sliding movements of the slider body 300 and second body 200. Since sliding modules are widely used in general slide type mobile communication devices, no detailed configuration thereof will be given.

Figure 4:
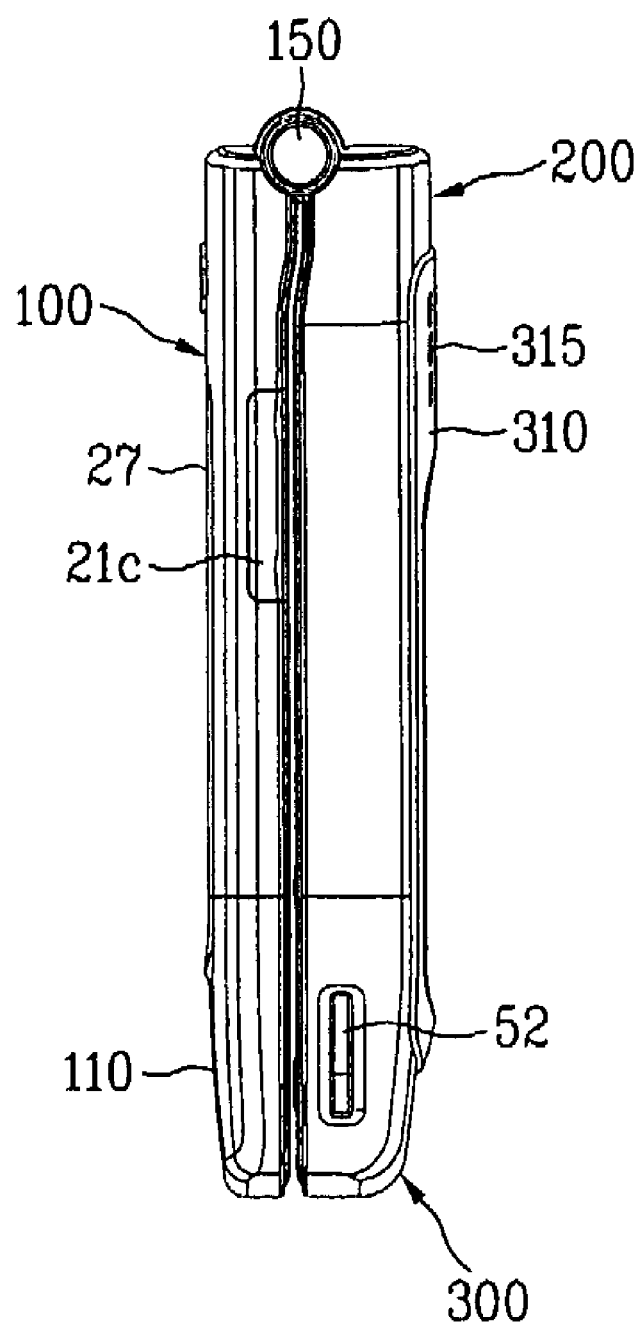
FIG. 4 is a side view of the mobile communication device shown in FIG. 1.

In order to allow the user to easily move the slider body 300 with respect to the first and second bodies 100 and 200, an inclined surface 110 may be provided at an end portion of the outer surface of the first body 100. As shown in FIGS. 2 and 4, the inclined surface 110 is arranged opposite to the hinge 150. The inclined surface 110 has an inclination capable of causing the inclined surface 110 to be touched by the thumb of one hand of the user when the user lays the thumb on the first body 100 while grasping the device by the hand. Accordingly, when the user touches the inclined surface 110 by the thumb while grasping the slider body 300, and pushes the first body 100, there is no slip between the thumb and the first body 100. Thus, it is possible to conveniently and easily move the slider body 300.

Figure 3:
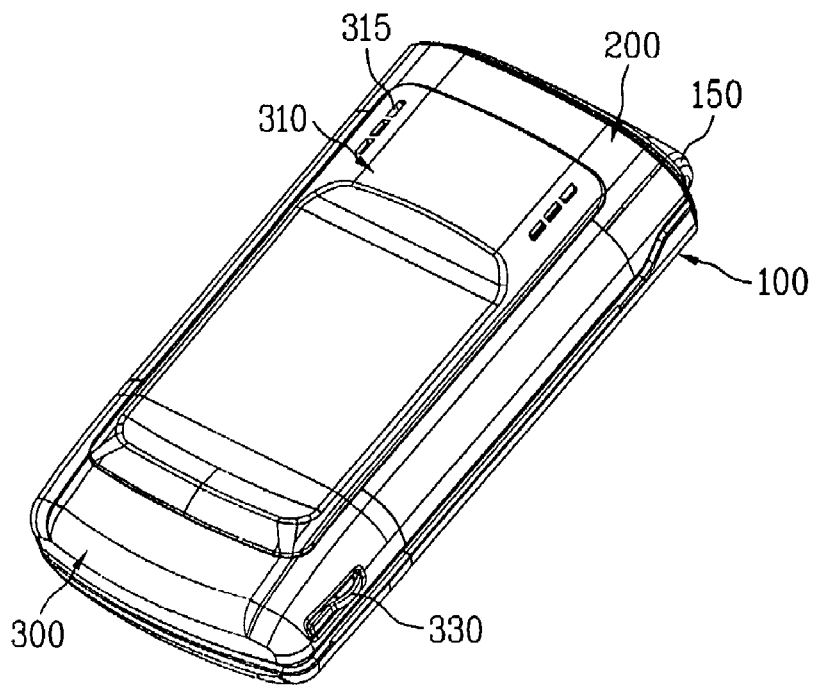
FIG. 3 is a perspective view of a back surface of the mobile communication device shown in FIG. 2.

The slider body 300, which is movable in the longitudinal direction of the device as described above, outwardly exposes the card-mounting slot 210 when moved to an open position, or covers the card-mounting slot 210 when moved to a closed position, to protect it. When the slider body 300 is at closed position, as shown in FIGS. 2 and 3, the card-mounting slot 210 is not outwardly exposed. As a result, the mobile communication device can provide a more pleasing appearance.

Figure 7:
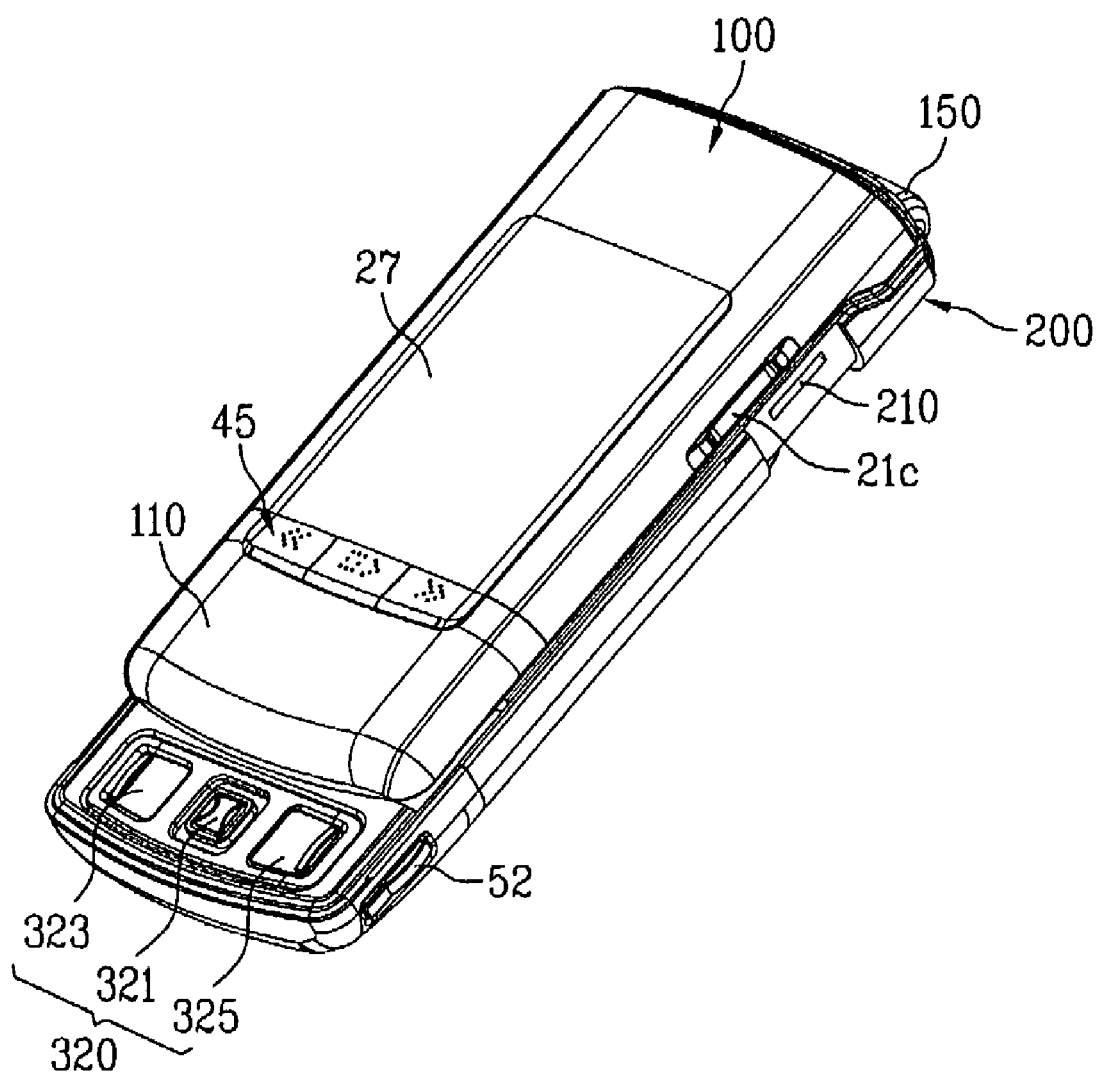
FIG. 7 is a perspective view of the slider body of the mobile communication device shown in FIG. 2 moved into the open position.

The slider body 300 may be configured to partially surround the outer and side surfaces of the second body 200 opposite to the inner surface of the second body 200. For example, the side and outer surfaces of the second body 200, except for an end portion arranged adjacent to the hinge 150, are surrounded by the slider body 300, as shown in FIGS. 3 and 8. Where the card-mounting slot 210 is provided at the side surface of the second body 200, as shown in FIGS. 6 and 7, the side surface of the slider body 300 outwardly exposes the card-mounting slot 210, or covers the card-mounting slot 210, as described above.

A battery cover 310 may be arranged at an outer surface of the slider body 300 to form a back surface of the housing, as shown in FIG. 3. The battery cover 310 may be separable from the slider body 300 when the slider body 300 has been moved to an open position, as shown in FIG. 8. When the battery cover 310 is separated from the slider body 300, a battery (not shown), which is mounted on the outer surface of the second body 200, is outwardly exposed. Thus, the user can replace the battery (not shown) with a new one after moving the slider body 300 to the position of FIG. 8, moving the battery cover 310 toward the hinge 150, and separating the battery cover 310 from the slider body 300.

While the speaker 43 is located in the second body 200, the speaker 43 may be arranged at a position where it is always outwardly exposed, irrespective of movement of the slider body 300. Alternatively, the speaker 43 may be arranged at a position where it is exposed or covered by the slider body 300 or battery cover 310 in accordance with movement of the slider body 300. In the latter case, as shown in FIGS. 3 and 8, a plurality of holes 315 may be formed through the slider body 300 or battery cover 310, in order to achieve effective sound emission even when the speaker 43 is covered.

As shown in FIG. 3, a terminal 330 for connecting an earphone or an ear microphone is provided at the slider body 300. For example, the terminal 330 may be arranged at the side surface of the slider body 300, and may be opened or closed by a cover. In the mobile communication device according to the present invention, the terminal 330 may be configured not only to simply connect an earphone or an ear microphone, but also to connect a power cable for receiving electric power from the external of the device or charging a battery, or the like.

Although not shown in FIGS. 2-10, the microphone 23 shown in FIG. 1 may be built in an end portion of the slider body 300. A microphone hole (not shown) may be located at the surface of the slider body 300 at a position corresponding to the position where the microphone 23 is arranged. Alternatively, the microphone 23 and microphone hole may be located in the second body 200, other than where the slider body 300 is located.

When the slider body 300 is at the closed position thereof, as shown in FIG. 3, it covers the lens 51 of the camera 50, to hide the lens 51. On the other hand, when the slider body 300 has been moved in the longitudinal direction of the second body 200, as shown in FIG. 8, it outwardly exposes the lens 51 of the camera 50. Accordingly, the user can perform a photographing operation after moving the slider body 300 to the position of FIG. 8, thereby exposing the lens 51. When the camera 50 is not used, returning the slider body 300 to the initial or original position, as shown in FIG. 3, protects the lens 51 of the camera 50.

When the slider body 300 is in the closed position thereof, the end portion of the inner surface of the slider body 300 is substantially flush with the inner surface of the second body 200, as shown in FIG. 5. The end portion of the inner surface of the slider body 300 is not outwardly exposed in a closed state of the housing, as shown in FIG. 2, because the end portion of the inner surface of the slider body 300 is arranged to face the first body 100. However, when the slider body 300 is moved from the closed position of the housing, as shown in FIG. 2, the end portion of the inner surface of the slider body 300 is outwardly exposed even in the closed position of the housing, as shown in FIG. 7.

As shown in FIGS. 5 to 7, the keys 320 are arranged at the end portion of the inner surface of the slider body 300. Accordingly, the keys 320 are not outwardly exposed in the closed position of the housing when the slider body 300 is at the initial position thereof, as shown in FIG. 2. However, when the slider body 300 is moved from the closed position of FIG. 2, the keys 320 are outwardly exposed even in the closed state of the housing, as shown in FIG. 7. In this arrangement, the keys 320 are exposed to be directed in the same direction as the outer display 27 located on the outer surface of the first body 100.

The keys 320 are configured to select various additional functions of the mobile communication device. For example, the keys 320 may include a key 321 having a direction key function for moving a cursor and a selection key function for selecting a function designated by the cursor, a key 325 for executing a menu mode, and a key 323 for performing execution canceling or moving the cursor to an upper menu. The key 321 can be moved in upper, lower, left, and right directions to determine a movement direction of the cursor, and can be depressed to select a desired function. It is understood that the functions of the keys 320 are exemplary and not intended to be limitive of the functions performable by the keys 320.

Figure 9:
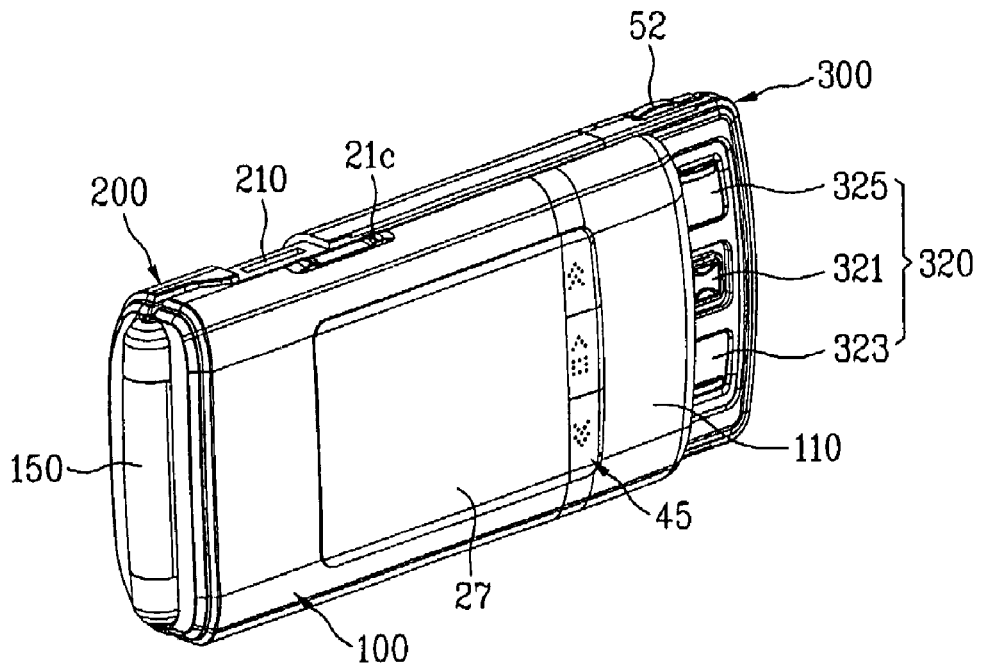
FIGS. 9 and 10 are perspective views of front and back surfaces, respectively, of the mobile communication device shown in FIG. 2 in a photographing mode.
Figure 10:
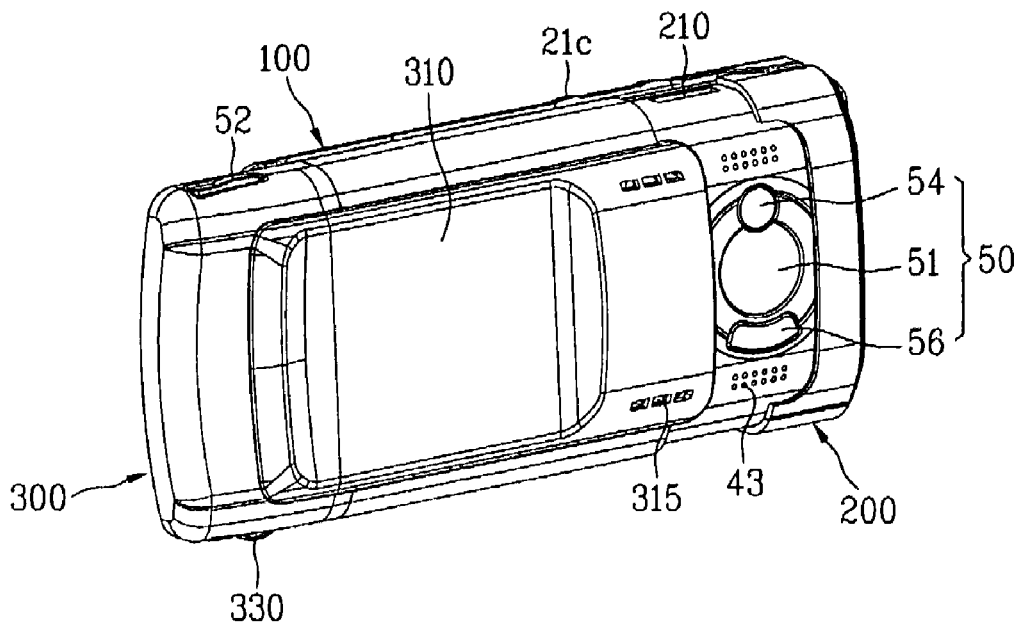

When the mobile communication device according to the present invention is horizontally positioned such that the longitudinal side surfaces thereof extend horizontally, with the slider body 300 in the open position, the outer display 27 and keys 320 are exposed at one surface of the device, whereas the lens 51 of the camera 50 is exposed at the other surface of the device, as shown in FIGS. 9 and 10. In this arrangement, the user can perform a photographing operation by grasping opposite corner portions of the device by both hands, and operating the keys 320 by the thumb of one hand while viewing the outer display 27. Since the outer display 27 extends lengthwise in the longitudinal direction of the device, the user can perform a photographing operation while viewing a screen, which is horizontally or laterally wide, as shown in FIG. 9.

Where the shutter button 52 is provided on the mobile communication device, it is preferred that the shutter button 52 be arranged on one side surface of the device adjacent to one corner of the device, in order to enable the user to conveniently perform a photographing operation while grasping the opposite corner portions of the device in an orientation in which the device is horizontally positioned, as shown in FIGS. 9 and 10. In more detail, the shutter button 52 is arranged on an upper surface of the corner at the left or right end of the device in a state in which the device is horizontally positioned. Preferably, the shutter button 52 is arranged on one side surface of the slider body 300 adjacent to one corner of the slider body 300.

Figure 11:
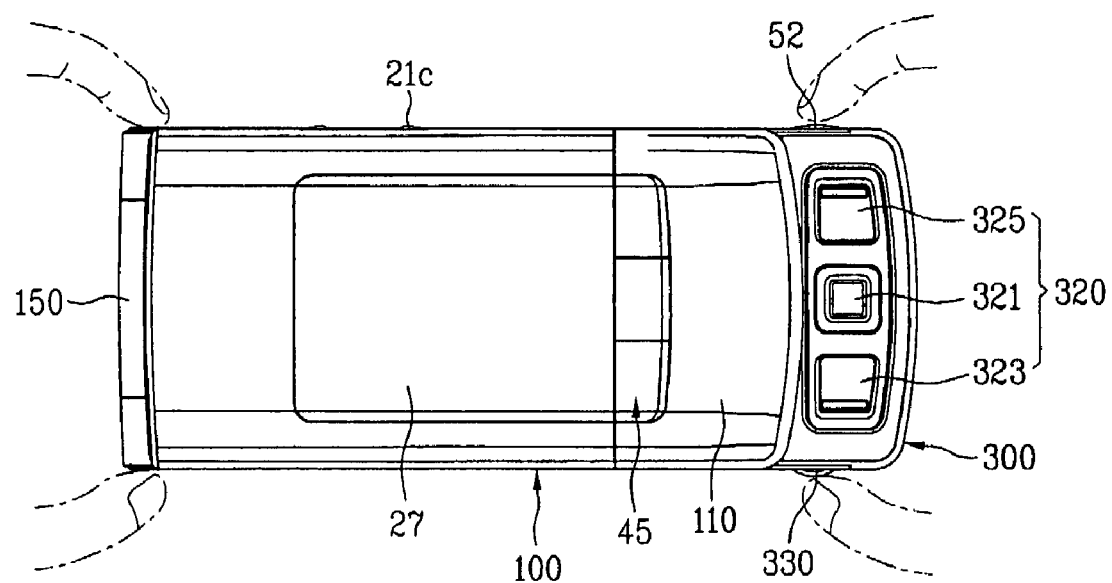
FIG. 11 is a schematic view of a photographing operation carried out using the mobile communication device of FIG. 9.

In the above-described arrangement, the finger of the user, in particular, the forefinger, can be directly laid on the shutter button 52, as shown in FIG. 11, when the user grasps the opposite corners of the device by the fingers in a state in which the device is horizontally positioned. Accordingly, the user can perform a photographing operation by pressing the shutter button 52 by the finger while viewing the outer display 27. The arrangements of the camera 50, outer display 27, keys 320, and shutter button 52 are identical to those of a general digital camera when the device is horizontally positioned for a photographing operation. Accordingly, the user can easily and conveniently perform a photographing operation using the mobile communication device according to the present invention.

Figure 12:
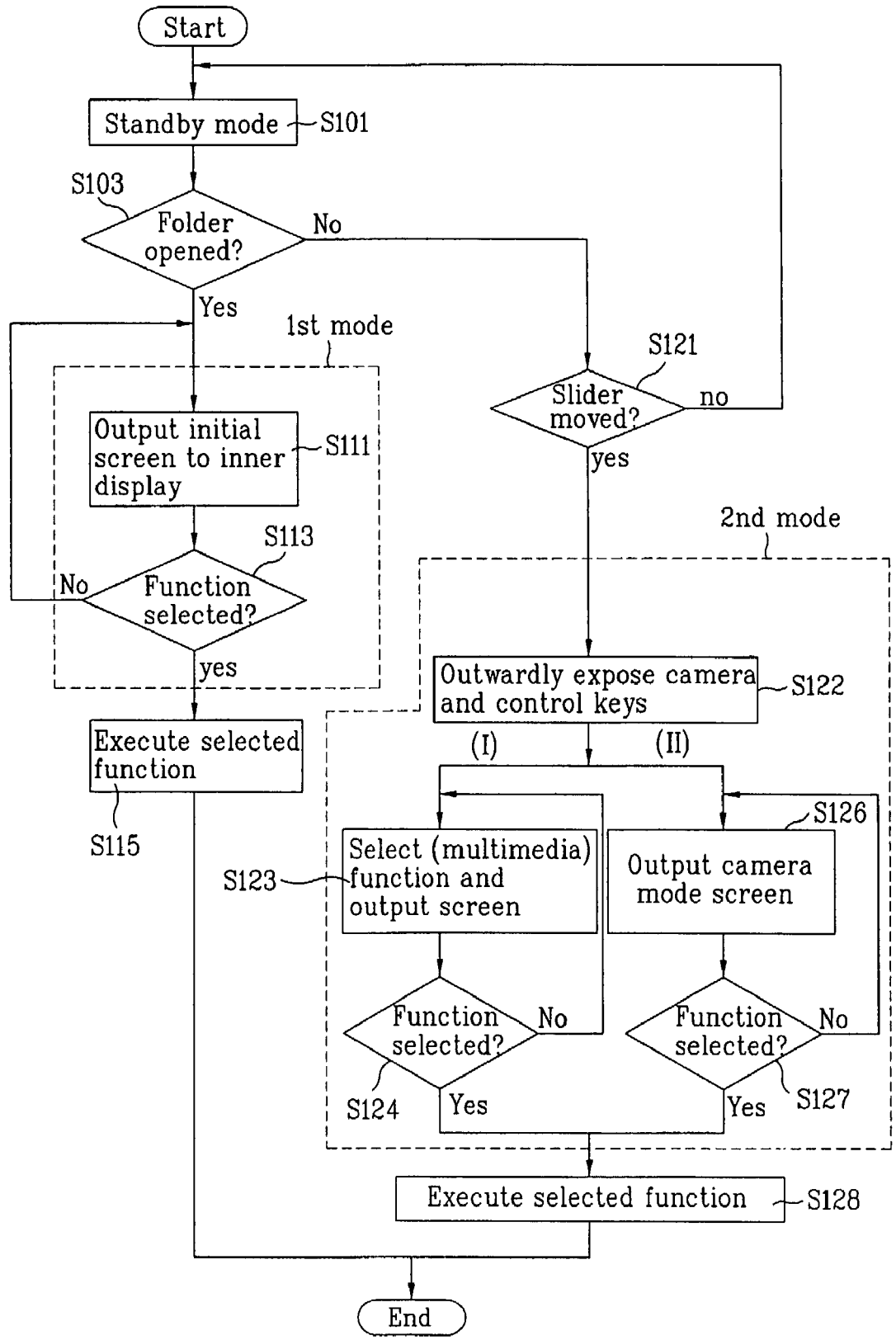
FIG. 12 is a flow chart illustrating a method for controlling the mobile communication device in accordance with the present invention.
Figure 13:
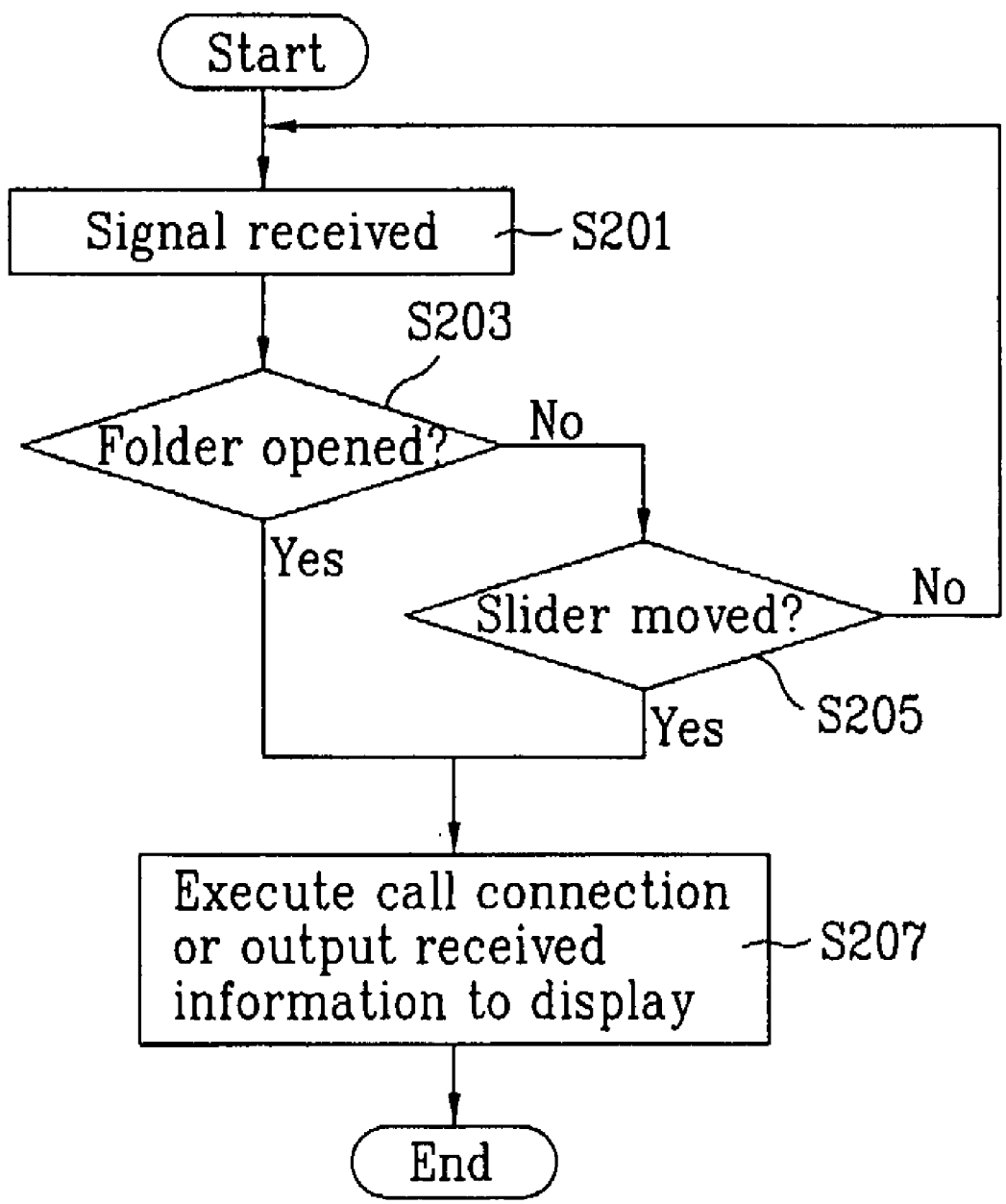
FIG. 13 is a flow chart illustrating a control method carried out when a signal is received by the mobile communication device in accordance with the present invention.
Figure 14:
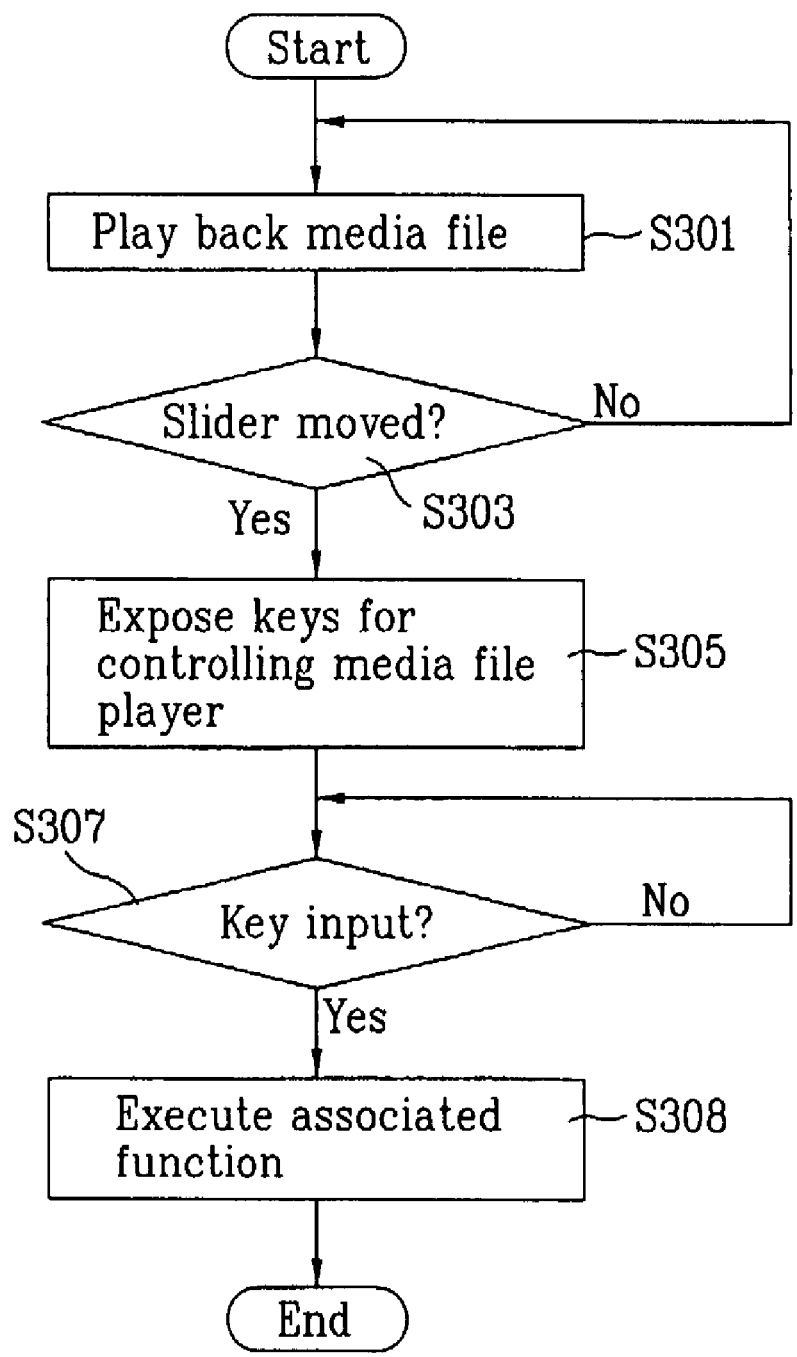
FIG. 14 is a flow chart illustrating a control method carried out when the mobile communication device plays back a media file in accordance with the present invention.

FIGS. 12 to 14 are flow charts illustrating a method for controlling the mobile communication device having the above-described configuration according to the present invention. Hereinafter, a control method, which controls the mobile communication device to provide useful and unique services to the user, will be described in more detail.

As shown in FIG. 12, a standby mode (S101) is executed in a state in which the first and second bodies 100 and 200 are closed, and no movement of the slider body 300 occurs. In the standby mode, the controller 15 checks whether or not the first and second bodies 100 and 200 are opened (S103), or checks whether or not movement of the slider body 300 occurs (S121). When the first and second bodies 100 and 200 are unfolded to be opened, the controller 15 executes a first mode. When the slider body 300 moves away from the second body 200, the controller 15 executes a second mode other than the first mode.

In the first mode executed when the first and second bodies 100 and 200 are opened, the inner display 29 outputs, for example, an initial screen (S111). In an initial mode, in which the initial screen is output, the user can select a desired one of the functions provided by the mobile communication device, using the keys 21 and 320 (S113). In response to the user's selection, the controller 15 executes the selected function (S115). For example, in the initial mode as the first mode, the user can make or receive a call, can send or receive a message, and can access the Internet. In addition, the user can enjoy a game, video, or music in the first mode. Furthermore, the user can substantially use most functions provided by the device.

In the second mode, which is executed when movement of the slider body 300 occurs, the lens 51 of the camera 50 and keys 320 are outwardly exposed (S122). The controller 15 may be programmed to execute the second mode in a type A or in a type B, as shown in FIG. 12. It is understood that whether the controller 15 executes the second mode in the type A or in the type B may be determined in the product manufacturing stage, or may be determined by the user in a device environment setting mode.

When the type A is executed as the second mode, the controller 15 outputs to the outer display 27 a screen allowing the user to select additional functions provided by the device simultaneously with the movement of the slider body 300 (S123).

The function selection menu output through the outer display 27 in the second mode may be limited to several specific functions or modes, for example, a camera mode and a multimedia file playback mode. Of course, the function selection menu may also include a game mode. Also, it is also possible to additionally store a menu, which is frequently used by the user when the slider body 300 has been moved, and thus, to output the stored menu through the outer display 27 when the second mode is executed.

The user can select one of the functions in the menu output to the outer display 27 using the keys 320 exposed in accordance with the movement of the slider body 300 or the shutter button 52 (S124). When one function is selected, the controller 15 executes the selected function, to provide an appropriate service to the user (S128).

For example, when the user selects the camera mode, the controller 15 outputs a camera mode screen. Accordingly, the user can use functions provided in the camera mode. For example, the user can set the environment of the camera, can view an album, or can perform a photographing operation. Of course, it is preferred that the photographing operation be carried out under the condition in which the device is horizontally arranged, as described with reference to FIG. 11. In this case, there is a great convenience in that the user can perform the photographing operation by selectively or simultaneously using the keys 320 and shutter button 52 while viewing the outer display 27, because the device provides the same outer shape and arrangement as those of a general digital camera.

The user can identify a photographed image through the outer display 27 after photographing the image, or can view stored photographs by controlling the keys 320. All functions usable in the photographing mode can be controlled using the keys 320 and shutter button 52. Accordingly, the mobile communication device according to the present invention can provide the same convenience and services as those of a general digital camera.

Meanwhile, when the user selects a multimedia file playback mode, he can enjoy desired music through the speaker 43 by operating the keys 320 to control the media file player 40. Of course, the user can also enjoy a desired video, learning contents, or the like through the outer display 27 and speaker 43 by operating the keys 320 to control the media file player 40.

When the type B is executed as the second mode, the controller 15 directly executes one of the additional functions provided by the device simultaneously with the movement of the slider body 300. For example, the controller 15 executes the camera mode simultaneously with the movement of the slider body 300 without providing the screen enabling selection of various function modes, and directly outputs the associated screen to the outer display 27 (S126).

In this case, the controller 15 may output the screen enabling various function modes in the camera mode, or directly outputs a screen enabling a photographing operation using the shutter button 52 or keys 320. In the latter case, it is preferred that the controller 15 activate the camera 50 simultaneously with the movement of the slider body 300, and the outer display 27 output an image captured through the lens 51 of the camera 50 on a real-time basis. Which of the above-described two modes is to be executed by the controller 15 may be determined in the product manufacturing stage, or may be determined in accordance with setting of an environment by the user. Meanwhile, when selection of a desired function or inputting of a desired command is carried out by the keys 320 or shutter button 52 (S127), the controller 15 executes the selected function (S128).

FIG. 13 illustrates a device control method carried out by the controller 15 when a reception signal, such as an incoming call or an incoming message, is received by the device. This will be described in brief hereinafter.

First, when a reception signal is received (S201), the controller 15 checks whether or not the first and second bodies 100 and 200 are opened (S203), or whether or not movement of the slider body 300 occurs (S205). The reception signal is continuously received for a predetermined time unless the first and second bodies 100 and 200 are opened, or unless movement of the slider body 300 occurs. During the signal reception, the device generates a reception sound informing of the signal reception, emits reception light, or generates vibrations.

When the first and second bodies 200 are opened, or when movement of the slider body 300 occurs, the controller 15 executes a call connection, or outputs the received message to at least one of the displays 27 and 29 (S207). Thus, the controller 15 allows the user to have a telephone conversation through the device or to identify the received message after moving the slider body 300 without opening the first and second bodies 100 and 200. Thus, the user can very conveniently use the device.

As described above, the user may also enjoy a video or music by calling up a menu after moving the slider body 300 or unfolding the first and second bodies 100 and 200, and then operating the media file player 40. Alternatively, the user can play a media file by pressing the keys 45 arranged on the outer surface of the first body 100 even in a folded state of the first and second bodies 100 and 200 or in a state in which no movement of the slider body 300 occurs.

When movement of the slider body 300 occurs during playback of a media file (S301), (S303), as shown in FIG. 14, the keys 320 are outwardly exposed even in a state in which the first and second bodies 100 and 200 are folded (S305). In response to the movement of the slider body 300, the controller 15 activates the keys 320 to enable the keys 320 to control the media file player 40. Accordingly, the user can input desired commands using the keys 320 to control the media file player 40. When a command is input through an associated one of the keys 320 (S307), the controller 15 executes an associated function to provide an appropriate service to the user.

As described above, the user can use the device after moving the slider body 300 or opening the first and second bodies 100 and 200 in accordance with his desire. In addition, the user can use the device after moving the slider body 300 when the first and second bodies 100 and 200 are already in an open position, or the user con use the device after opening the first and second bodies 100 and 200 when the slider body 300 is already in an open position, as shown in FIG. 6.

The controller 15 is programmed to provide multiple services to the user using an appropriate combination of the above described various control methods. It is understood, the method may be changeable by changing the set environment of the device by user.

As apparent from the above description, the mobile communication device according to the present invention can satisfy the demand of consumers desiring a new and unique design because the device has a combination of a folder type housing structure and a slide type housing structure.

The mobile communication device according to the present invention enables the user to conveniently perform a photographing operation because the device provides the same outer shape and arrangement as those of a general digital camera in a photographing mode.

The present invention also provides a very unique control method capable of controlling the mobile communication device having a unique structure, which is a combination of a folder type structure and a slide type structure. Accordingly, it is possible to satisfy the demand of consumers desiring a mobile communication device with a new and unique structure and function.

In addition, the present invention provides an optimal control method for a mobile communication device that enables the user to conveniently use functions associated with multimedia, and to conveniently perform a photographing operation. Accordingly, the present invention achieves an enhancement in the convenience of the user.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A mobile communication device comprising:
a first body including a display arranged at an outer surface thereof;
a second body foldably connected to the first body;
a slider body slidably connected to the second body to slide on an outer surface of the second body in one direction, the slider body having at least one key that faces an inner surface of the first body opposite to the outer surface of the first body such that the at least one key is not outwardly exposed when the slider body is at an initial position thereof;
a camera located in the second body and arranged at an outer surface of the second body opposite to the inner surface of the second body, the camera being covered with the slider body such that the camera is not outwardly exposed when the slider body is at the initial position thereof;
a photographing shutter button located on a side surface of the device adjacent one of the corners of the device, the photographing shutter button being configured to enable a user to perform a photographing operation while grasping the corners of the device;
a controller checking whether or not movement of the slider body in one direction occurs,
wherein the slider body slides on the second body in one direction away from the initial position of the slider body and the camera to expose the camera and the at least one key when the first body and the second body are folded with respect to each other,
wherein the display and the at least one key are exposed at one major surface of the mobile terminal and the camera is exposed at the other major surface of the mobile terminal,
wherein the controller activates the display to execute a photographing mode when the slider body is moved into the open position, wherein the display is directed opposite to the camera and is located on the first body such that the display is exposed in a closed position of the first and second bodies, and wherein the at least one key is exposed in the same direction as the display, and the at least one key is configured to control additional functions of the device.

2. The device according to claim 1, wherein the controller executes a menu selection mode for selection of additional functions when the slider body is moved into the open position.

3. The device according to claim 1, further comprising:
a card-mounting slot provided at the second body, the card-mounting slot being exposed when the slider body is moved into the open position.

4. The device according to claim 3, wherein the second body includes a side surface, and the card-mounting slot is formed through the side surface of the second body.

5. The device according to claim 4, wherein the slider body has a side surface that partially covers the side surface of the second body.

* * * * *